US012803483B2

(12) United States Patent
Alam et al.

(10) Patent No.: US 12,803,483 B2
(45) Date of Patent: Nov. 17, 2026

(54) HYBRID CONVERSION DEVICE INCLUDING SWITCHING MODULES FOR DIFFERENT SWITCH COMPOSITIONS

(71) Applicant: GM GLOBAL TECHNOLOGY OPERATIONS LLC, Detroit, MI (US)

(72) Inventors: Khorshed Mohammed Alam, Canton, MI (US); Yilun Luo, Ann Arbor, MI (US); Chandra S. Namuduri, Troy, MI (US); Mohammad N. Anwar, Northville, MI (US); Korobi Basher, Rochester Hills, MI (US); Benjamin S. Ngu, Rochester Hills, MI (US); Michael Zigmund Pieszala, Panama City, FL (US); Luciano N. Di Perna, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 105 days.

(21) Appl. No.: 18/912,970

(22) Filed: Oct. 11, 2024

(65) Prior Publication Data

US 2026/0106565 A1 Apr. 16, 2026

(51) Int. Cl.
*H02P 27/08* (2006.01)
*H02M 7/5387* (2007.01)
*H02P 27/06* (2006.01)

(52) U.S. Cl.
CPC ........ *H02P 27/08* (2013.01); *H02M 7/53873* (2013.01); *H02M 7/5387* (2013.01); *H02P 27/06* (2013.01)

(58) Field of Classification Search
CPC ................ H02M 7/487; H02P 23/0027; H02P 23/0031; H02P 25/022; H02P 27/14
See application file for complete search history.

(56) References Cited

U.S. PATENT DOCUMENTS

| | | | | |
|---|---|---|---|---|
| 8,094,475 | B2 | 1/2012 | Friebe et al. | |
| 9,654,028 | B1 * | 5/2017 | Luo | H02M 7/537 |
| 10,211,737 | B1 * | 2/2019 | Costa | H02M 1/4225 |
| 2024/0322726 | A1 * | 9/2024 | Rosen | H02P 23/0027 |

FOREIGN PATENT DOCUMENTS

| | | |
|---|---|---|
| DE | 102017206553 A1 | 7/2018 |
| DE | 102020201810 A1 | 8/2021 |

OTHER PUBLICATIONS

German Office Action for German Application No. 102024135753.3; dated May 15, 2025; 7 pages.

* cited by examiner

*Primary Examiner* — Terrell S Johnson
(74) *Attorney, Agent, or Firm* — CANTOR COLBURN LLP

(57) ABSTRACT

A device for driving an electric motor includes a converter assembly including a plurality of switches, the plurality of switches including a first phase leg and a second phase leg, the first phase leg including a first pair of switches connected in parallel to a first phase of the electric motor, the second phase leg including a second pair of switches connected in parallel to a second phase of the electric motor. The device includes a first topological switch having one or more first switches of the plurality of switches, the one or more first switches having a first composition, and a second topological switch having one or more second switches of the plurality of switches, the one or more second switches having a second composition, the first composition being different than the second composition.

20 Claims, 6 Drawing Sheets

HYBRID CONVERSION DEVICE INCLUDING SWITCHING MODULES FOR DIFFERENT SWITCH COMPOSITIONS

INTRODUCTION

The subject disclosure relates to inverters, and more specifically, to inverters used to drive electric motors.

An electric or hybrid vehicle employs one or more electric motors for propulsion, and typically includes a power inverter to drive the electric motor(s). A power inverter functions to transform direct current (DC) power to alternating current (AC) and modulate current supplied to each phase of an electric motor. A modulation scheme such as pulse width modulation (PWM) is used to control switching in an inverter. It is desirable to improve inverter systems and other conversion systems to, for example, reduce losses and more efficiently drive electric motors.

SUMMARY

In one exemplary embodiment, a device for driving an electric motor includes a converter assembly including a plurality of switches, the plurality of switches including a first phase leg and a second phase leg, the first phase leg including a first pair of switches connected in parallel to a first phase of the electric motor, the second phase leg including a second pair of switches connected in parallel to a second phase of the electric motor. The device includes a first topological switch having one or more first switches of the plurality of switches, the one or more first switches having a first composition, and a second topological switch having one or more second switches of the plurality of switches, the one or more second switches having a second composition, the first composition being different than the second composition.

In addition to one or more of the features described herein, the converter assembly is configured as an inverter.

In addition to one or more of the features described herein, at least one of the first topological switch the second topological switch is part of a module, the module is removable and replaceable within the converter assembly, and the module includes connection components configured to connect at least one of the first topological switch the second topological switch to another topological switch of another module of the device.

In addition to one or more of the features described herein, the plurality of switches are semiconductor switches, the first composition includes a first substrate and the second composition includes a second substrate, the first substrate having a different composition than the second substrate, each of the first substrate and the second substrate being a silicon-based substrate or a non-silicon-based substrate.

In addition to one or more of the features described herein, each of the one or more first switches is a Silicon switch, and each of the one or more second switches is selected from at least one of: a Silicon-Carbide switch and a Gallium-Nitride switch.

In addition to one or more of the features described herein, the one or more first switches have a first switching speed and the one or more second switches have a second switching speed, the first switching speed is higher than the second switching speed, and the one or more first switches are selected based on a length of a switching loop.

In addition to one or more of the features described herein, the one or more first switches have a first maximum temperature and the one or more second switches have a second maximum temperature, the first maximum temperature is greater than the second maximum temperature, and the one or more first switches are positioned based on a thermal distribution of the device during operation.

In addition to one or more of the features described herein, the first topological switch is part of a first module and the second topological switch is part of a second module, the first module and the second module are removeable and replaceable, and the first module and the second module are disposed in a single power module connectable to a battery and the electric motor.

In another exemplary embodiment, a method of driving an electric motor includes controlling a converter assembly to supply electric power to the electric motor. The converter assembly includes a plurality of switches, the plurality of switches including a first phase leg and a second phase leg, the first phase leg including a first pair of switches connected in parallel to a first phase of the electric motor, the second phase leg including a second pair of switches connected in parallel to a second phase of the electric motor. The converter assembly also includes a first topological switch having one or more first switches of the plurality of switches, the one or more first switches having a first composition, and a second topological switch having one or more second switches of the plurality of switches, the one or more second switches having a second composition, the first composition being different than the second composition.

In addition to one or more of the features described herein, the converter assembly is configured as an inverter.

In addition to one or more of the features described herein, at least one of the first topological switch the second topological switch is part of module, the module is removable and replaceable within the converter assembly, and the module includes connection components configured to connect at least one of the first topological switch the second topological switch to another topological switch of another module of the converter assembly.

In addition to one or more of the features described herein, the plurality of switches are semiconductor switches, the first composition includes a first substrate and the second composition includes a second substrate, the first substrate has a different composition than the second substrate, and each of the first substrate and the second substrate is a silicon-based substrate or a non-silicon-based substrate.

In addition to one or more of the features described herein, the converter assembly is controlled based on a pulse width modulation scheme, and the pulse width modulation scheme prescribes a single dead time and a single pulse width for the plurality of switches.

In addition to one or more of the features described herein, the one or more first switches have a first switching speed and the one or more second switches have a second switching speed, the first switching speed is higher than the second switching speed, and the one or more first switches are selected based on a length of a switching loop.

In addition to one or more of the features described herein, the one or more first switches have a first maximum temperature and the one or more second switches have a second maximum temperature, the first maximum temperature is greater than the second maximum temperature, and the one or more first switches are positioned based on a thermal distribution of the converter assembly during operation.

In addition to one or more of the features described herein, the first topological switch is part of a first module and the second topological switch is part of a second module, the first module and the second module are removeable and replaceable, and the first module and the second module are disposed in a single power module connectable to a battery and the electric motor.

In yet another exemplary embodiment, a vehicle system includes a memory having computer readable instructions, and a processing device for executing the computer readable instructions, the computer readable instructions controlling the processing device to perform a method. The method includes controlling a converter assembly to supply electric power to an electric motor, the converter assembly including a plurality of switches, the plurality of switches including a first phase leg and a second phase leg, the first phase leg including a first pair of switches connected in parallel to a first phase of the electric motor, the second phase leg including a second pair of switches connected in parallel to a second phase of the electric motor. The converter assembly also includes a first topological switch having one or more first switches of the plurality of switches, the one or more first switches having a first composition, and a second topological switch having one or more second switches of the plurality of switches, the one or more second switches having a second composition, the first composition being different than the second composition.

In addition to one or more of the features described herein, at least one of the first topological switch the second topological switch is part of a module, the module is removable and replaceable within the converter assembly, and the module includes connection components configured to connect at least one of the first topological switch the second topological switch to another topological switch of another module of the device.

In addition to one or more of the features described herein, the plurality of switches are semiconductor switches, the first composition includes a first substrate and the second composition includes a second substrate, the first substrate having a different composition than the second substrate, each of the first substrate and the second substrate being a silicon-based substrate or a non-silicon-based substrate.

In addition to one or more of the features described herein, the module is disposed in a single power module connectable to a battery and the electric motor.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
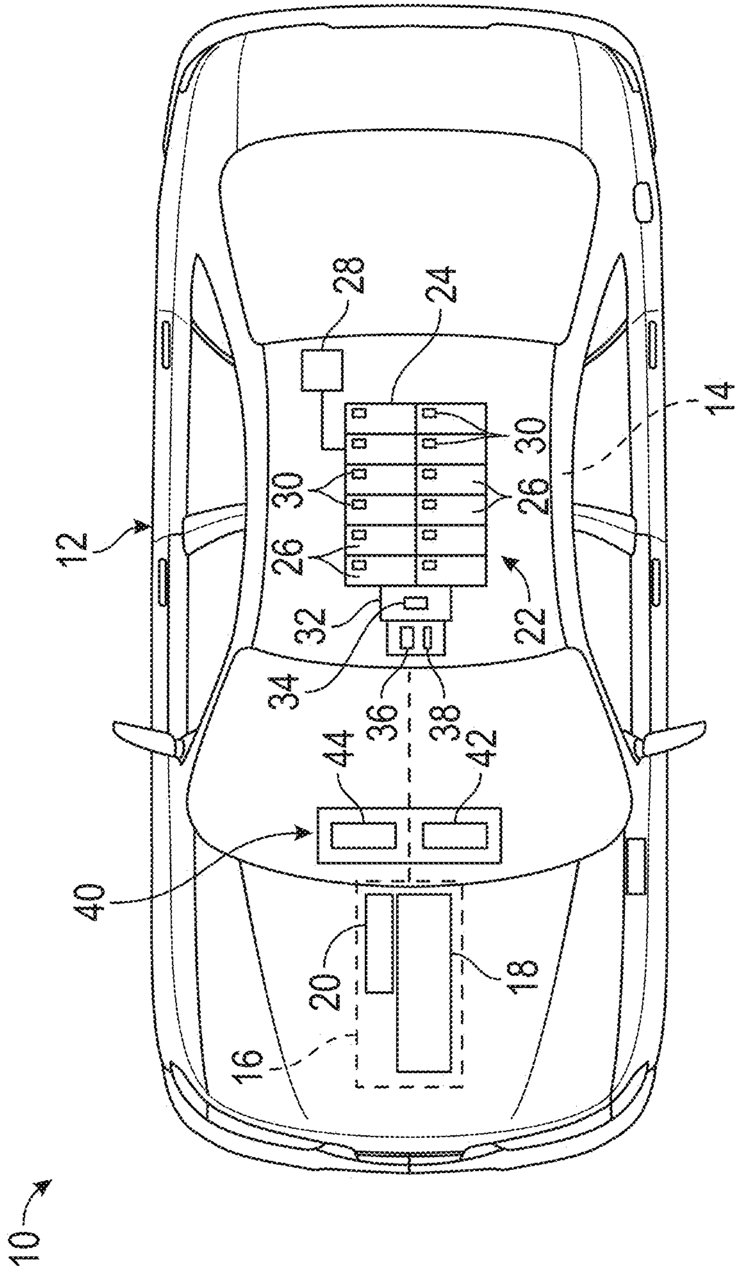
FIG. 1 is a top, schematic view of a motor vehicle including a battery system and an inverter system, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, methods, devices and systems are provided for electrical conversion using hybrid conversion circuits. An embodiment of a conversion assembly or device, such as an inverter assembly, includes a plurality of modules. Each module includes one or more semiconductor power switches of a selected composition. The modules include appropriate connection features (e.g., signal pins, terminals, etc.), so that each module is removable and replaceable.

In an embodiment, the conversion device is an inverter assembly configured to drive an electric motor. An example of such an electric motor is a three-phase or polyphase motor of an electric or hybrid vehicle.

In an embodiment, the inverter assembly includes a plurality of modules (switching modules), which can be interchangeably connected in an inverter package (e.g., a power module) or other converter package. For example, a first switching module includes one or more dies (e.g., Silicon (Si) dies) for supporting components of a switch or switches having one switch composition (e.g., an Si transistor such as an insulated gate bipolar transistor). A second switching module includes one or more dies (e.g., a Silicon Carbide (SiC) dies) having a different switch composition (e.g., a SiC metal-oxide-semiconductor field-effect transistor).

Each switching module includes a topological switch, which may include a single switch or multiple switches having the same composition, or having different compositions. The modular construction described herein eliminates complex power module and gate driver designs that are currently needed when adding different active semiconductor-based dies in the same converter package, and also allows for flexibility in changing an inverter or converter design. Embodiments also provide scalability to use different amounts of premium materials (i.e., SiC) based on available resources, and desired efficiency and performance.

Embodiments described herein present numerous advantages and technical effects. The embodiments provide for increases in efficiencies by providing switches having different compositions and capabilities. In addition, embodiments may be modular, allowing for ease of replacement and configuration changes.

The embodiments are not limited to use with any specific vehicle and may be applicable to various contexts. For example, embodiments may be used with automobiles, trucks, aircraft, construction equipment, farm equipment, automated factory equipment and/or any other device or system that uses conversion devices.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, a fuel injection subsystem, an exhaust subsystem and others.

The vehicle may be a combustion engine vehicle, an electrically powered vehicle (EV) or a hybrid electric vehicle (HEV). In an example, the vehicle 10 is a hybrid vehicle that includes a combustion engine 18 and an electric motor 20.

The vehicle 10 includes a battery system 22, which may be electrically connected to the motor 20 and/or other components, such as vehicle electronics. In an embodiment, the battery system 22 includes a battery assembly such as a high voltage battery pack 24 having a plurality of battery modules 26. Each of the battery modules 26 includes a number of individual cells (not shown). The battery system 22 may also include a monitoring unit 28 configured to receive measurements from sensors 30. Each sensor 30 may be an assembly or system having one or more sensors for measuring various battery and environmental parameters, such as temperature, current and voltages. The monitoring unit 28 includes components such as a processor, memory, an interface, a bus and/or other suitable components.

The battery system 22 includes various conversion devices for controlling the supply of power from the battery pack 24 to the motor 20 and/or electronic components. The conversion devices include, for example, a DC-DC converter module 32 for adjusting direct current (DC) from the battery pack 24 when driving the electric motor 20.

The conversion devices also include a power module 34 that includes an inverter circuit 36 (referred to herein as an inverter 36) and a controller 38. The inverter 36 receives DC power directly from the battery pack, or via the DC-DC converter 32, and converts direct current (DC) power to alternating current (AC) power that is supplied to the electric motor 20. The inverter 36 may receive power from any suitable power source, and is thus not limited to receiving power from a battery pack or battery system. For example, the vehicle 10 may include a fuel cell stack for providing power to the inverter 36.

The inverter 36 includes one or more sets of switches or switching devices (e.g., controllable semiconductor switches such as metal-oxide-semiconductor field-effect transistors (MOSFETs)) that are controllable to supply AC power to each phase of the motor 20.

In an embodiment, the inverter 36 has a hybrid configuration, in which semiconductor switches having different compositions are used in the same inversion circuitry. The inverter 36 includes a plurality of switching modules as described further herein, where at least one switching module includes switches having the same composition. The switching modules are removable and replaceable, allowing for ease in changing switching configurations.

The vehicle 10 also includes a computer system 40 having one or more processing devices 42 and a user interface 44. The various processing devices and units may communicate with one another via a communication device or system, such as a controller area network (CAN) or transmission control protocol (TCP) bus.

Figure 2:
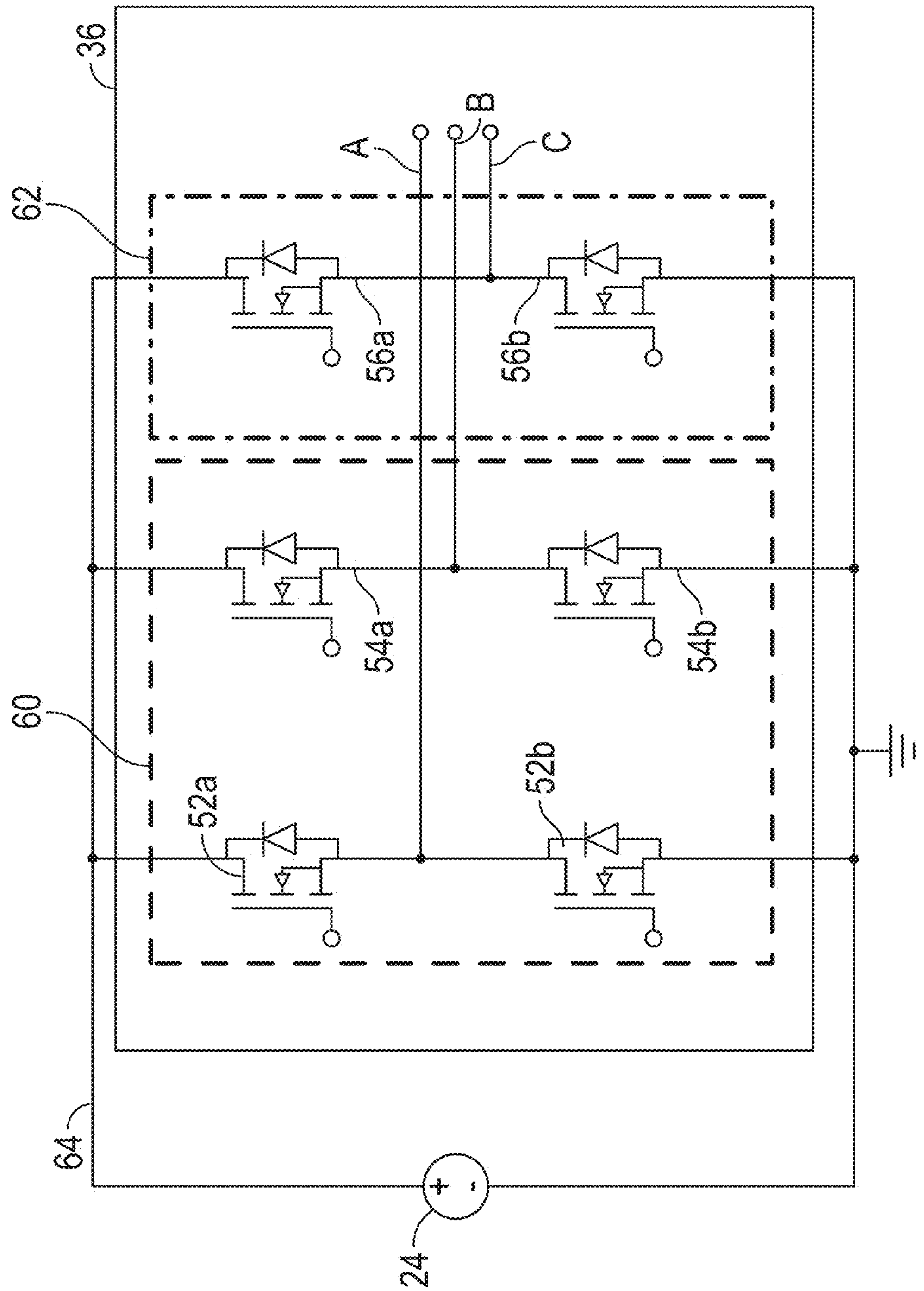
FIG. 2 depicts an inverter assembly for driving an electric motor, in accordance with an exemplary embodiment.
Figure 3:
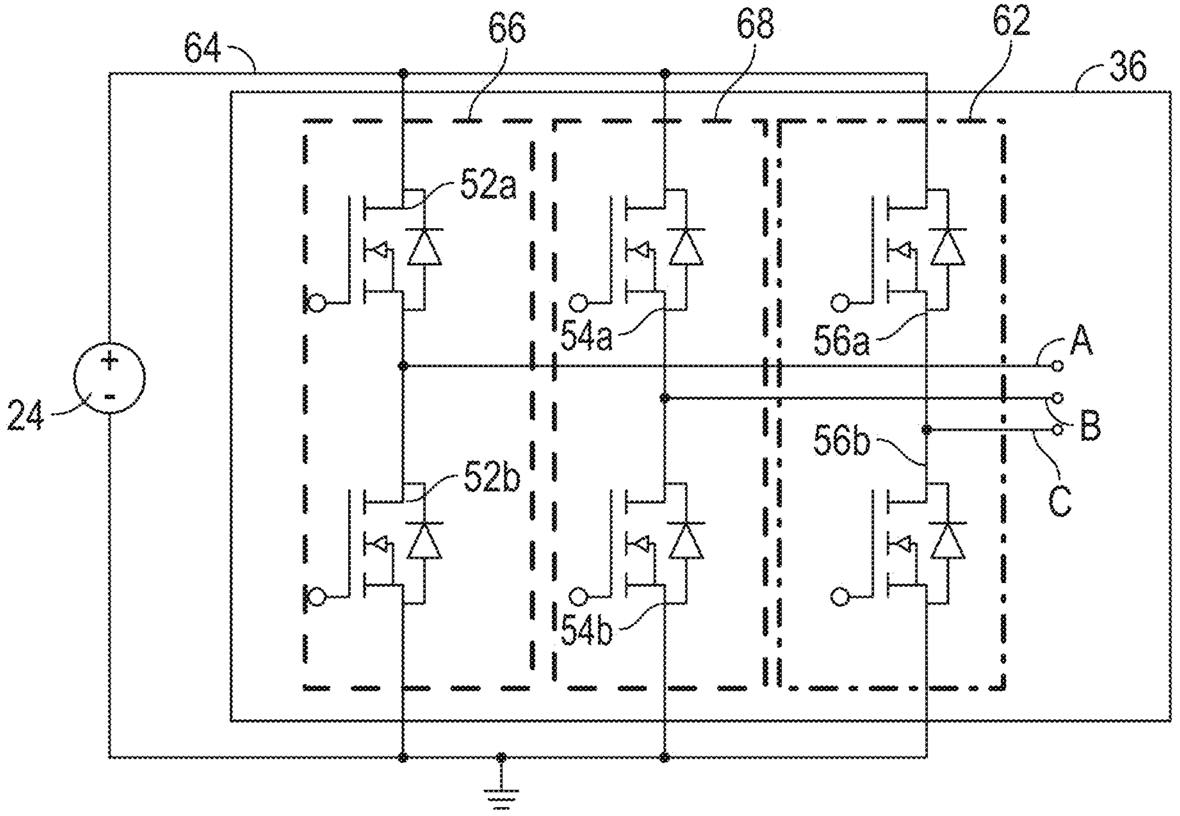
FIG. 3 depicts an inverter assembly for driving an electric motor, in accordance with an exemplary embodiment.

FIGS. 2 and 3 depict components of embodiments of the inverter 36. The inverter 36 is described as being part of the propulsion system 16 and the motor 20 of the vehicle 10, but is not so limited. The inverter 36 may be part of, or form, a power stage for driving any suitable vehicle, motor or system that uses an electric motor. Components of the inverter 36 are described as being controlled by the controller 38; however, any suitable control device or system may be used.

The inverter 36, in an embodiment, is a multi-phase inverter. Although the inverter 36 is discussed as a three-phase inverter, embodiments are not so limited, as the inverter 36 can be configured for any suitable number of phases.

In an embodiment, the inverter 36 is a three-phase inverter configured to drive a three-phase motor having phases A, B and C. The inverter 36 includes a pair of switches connected in parallel to each phase, and connected to the battery pack 24 and the motor 20 (not shown) via a propulsion bus 64.

A first pair of switches **52*a* and 52*b* is connected to a first motor phase (phase A), a second set of switches 54*a* and 54*b* is connected to a second motor phase (phase B), and a third set of switches 56*a* and 56*b* is connected to a third motor phase (phase C). Each pair of switches is connected to a motor phase in a half-bridge configuration. Embodiments are not so limited, as the inverter 36** (or other conversion device) may have any suitable switch configuration (e.g., full bridge, six-pack, discrete, etc.).

Any suitable device may be employed as a switch. For example, the switches can include solid state relays and transistors such as Silicon (Si) insulated gate bipolar transistors (IGBTs), and field-effect transistors (FETs). Examples of FETs include metal-oxide-semiconductor FETs (MOSFETs), Si MOSFETs, silicon carbide (SiC) MOSFETs, gallium nitride (GaN) high electron mobility transistors (HEMTs), and SiC junction-gate FETs (JFETs). Other examples of switches that can be used include diamond, gallium oxide and other wide band gap (WBG) semiconductor-based power switch devices.

In an embodiment, the inverter 36 includes a plurality of switching modules, where each switching module includes a topological switch formed from one or more switches having the same composition. A topological switch refers to a circuit formed on a die or dies (or other support structure) making up at least one of the switches. A topology of the topological switch may include a single switching device or multiple switching devices.

The switching modules allow the inverter 36 to be customizable and scalable. For example, the modules are removable and replaceable, such that a module can be replaced with another module having a different switch composition, for purposes such as increasing vehicle range or improving performance (e.g., switching speed, drive torque levels, etc.).

The inverter 36 may have any suitable configuration and/or be of any suitable type. For example, the inverter 36 may have any of a variety of traction inverter topologies, such as two-level (e.g., as shown in FIG. 2), multi-level, current source, z-source, resonant and other topologies.

In FIG. 2, the inverter 36 includes a first module 60 (e.g., a first set of dies having one or more first switches formed thereon) that includes a set (i.e., one or more) of first switches having a first composition. For example, each first switch is a Silicon power switch, such as an Si MOSFET or IGBT. In an embodiment, the first switches of the first module 60 include the switches **52*a*, 52*b*, 54*a* and 54*b***.

The inverter 36 includes a second module 62 (e.g., a second set of dies having one or more second switches formed thereon) that includes a set of second switches having a second composition. For example, each second switch is a WBG switch such as a SiC switch or a GaN switch. In an embodiment, the second switches of the second module 62 include the switches 56*a* and 56*b*.

For example, each first switch 52*a*, 52*b*, 54*a* and 54*b* is a Si switch formed on a Silicon substrate, such as an IGBT with a diode and/or a reverse-conducting IGBT. Each second switch 56*a* and 56*b* in this example, is a SiC IGBT. Other compositions may be employed, such as Gallium-based switches (i.e., HEMT/Vertical GaN, Ga2O3, etc.), aluminum nitride, diamond, and others.

In FIG. 3, the inverter 36 includes a module for each phase leg. The inverter 36 includes a phase A module 66 that includes the switches 52*a* and 52*b*. A phase B module 68 includes the switches 54*a* and 54*b*. The switches in module 66 and the module 68 have a first composition. For example, each first switch is a Silicon power switch, such as an Si MOSFET or IGBT.

The inverter 36 includes the second module 62 of FIG. 2. The second module in this embodiment is a phase C module that includes the switches 56*a* and 56*b*, which have a second composition. For example, each switch 56*a* and 56*b* is a WBG switch such as a SiC switch or a GaN switch.

The inverter 36 is not limited to the embodiments of FIGS. 2 and 3, as each module may include any number of switches. For example, each switch 52*a*, 52*b*, 54*a*, 54*b*, 56*a* and 56*b* may be housed in a separate module, allowing for each switch to be individually replaced (with the same type of switch or different type of switch).

Figure 4:
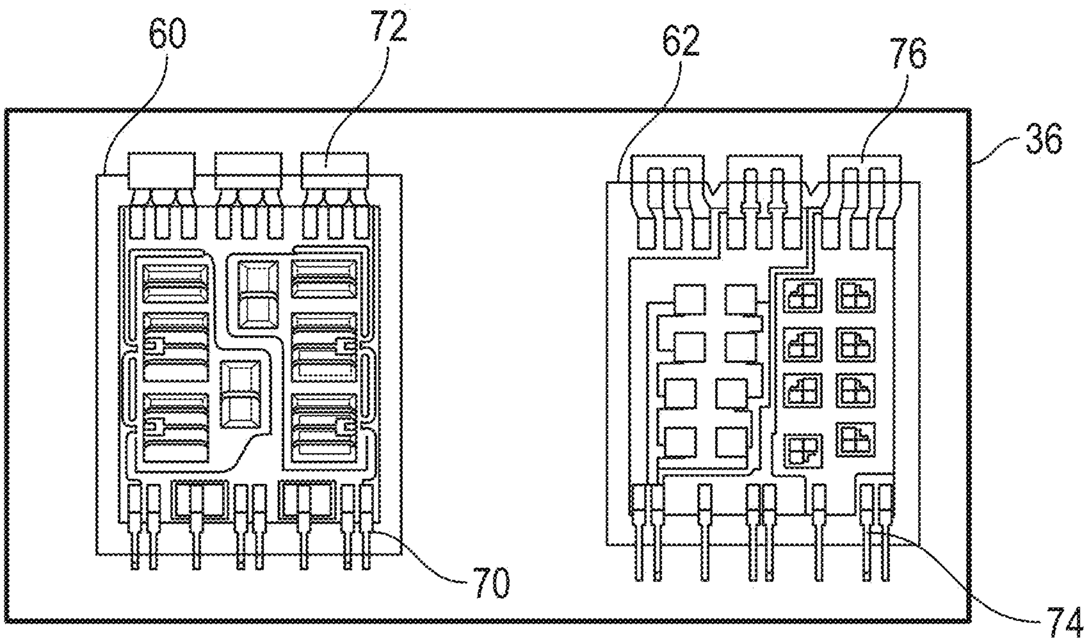
FIG. 4 depicts examples of switching modules of the inverter assembly of FIG. 2.
Figure 5:
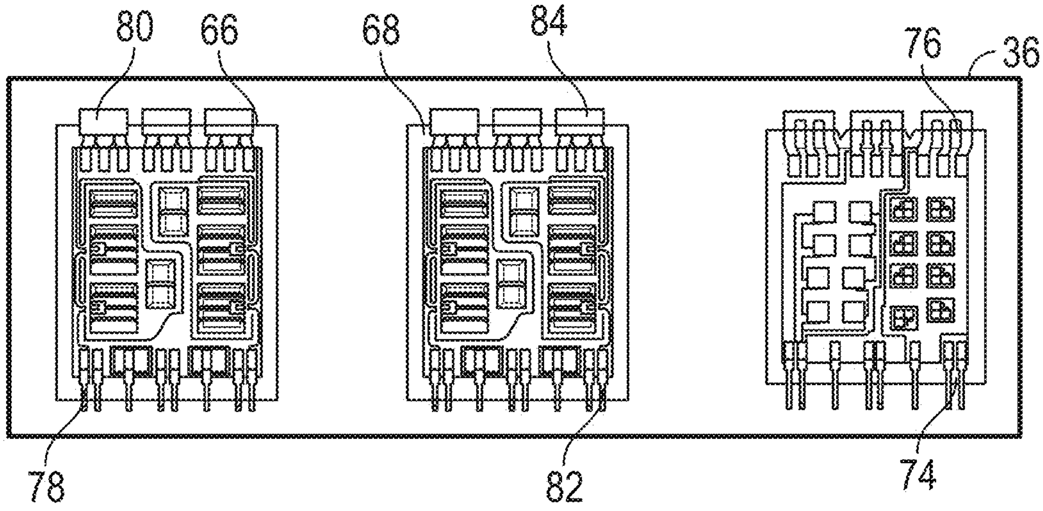
FIG. 5 depicts examples of switching modules of the inverter assembly of FIG. 3.

FIGS. 4 and 5 depict examples of the inverter 36, and show how switching modules can be configured in different ways. FIG. 4 corresponds to the embodiment shown in FIG. 2, in which a single switching module 60 includes all of the switches for phases A and B. The module 60 also includes a set of signal pins 70 for outputting AC signals, and a set of gate terminals 72.

The switching module 62 includes the switches 56*a* and 56*b* for phase C. The switching module 62 includes signal pins 74 and gate terminals 76. At least because each module only has switches of one type or composition, fewer signal pins are needed as compared to existing hybrid switching devices that have different switch compositions in a single module.

FIG. 5 corresponds to the embodiment of FIG. 4, in which the inverter 36 includes the switching module 66 having one or more dies for the phase A switches 52*a* and 52*b*, and includes the switching module 68 for the phase B switches 54*a* and 54*b*. The switching module 66 includes signal pins 78 and gate terminals 80, and the switching module 68 includes signal pins 82 and gate terminals 84.

Each switching module includes circuit components and interconnects for connecting the switching module to other modules in parallel to a bus (e.g., the propulsion bus 64) and to the motor 20. For example, each switching module includes gate drivers and power supplies, where each gate driver is optimized to provide a proper voltage to a respective switch.

A switching module may include one switch or multiple switches. In addition, a switching module may include any combination of switching components of the inverter. For example, in FIGS. 3 and 4, each phase leg is connected to switches having the same composition.

Although the switching modules are discussed as including switches that have the same composition, embodiments are not so limited. For example, a switching module may have a single switch or multiple switches. In addition, a switching module may include switches having the same composition or different compositions (i.e., at least one switch having a different composition than one or more other switches of the switching module).

Figure 6:
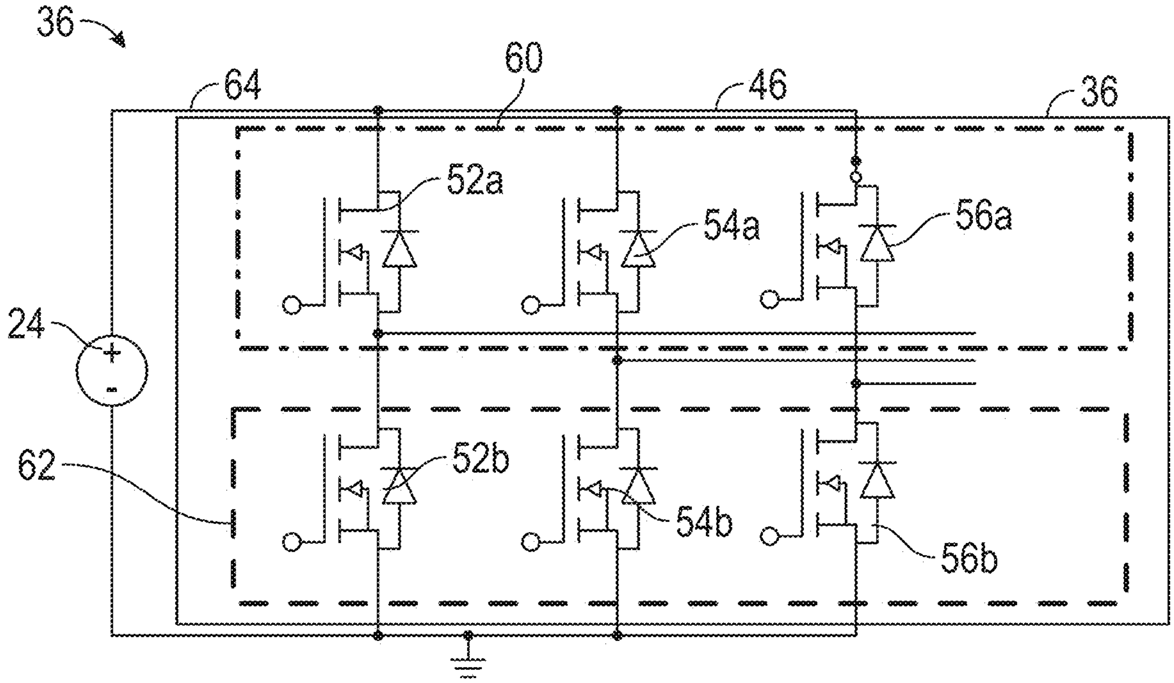
FIG. 6 depicts an inverter assembly for driving an electric motor, in accordance with an exemplary embodiment.

In an embodiment, multiple modules may be connected to the same phase leg. FIG. 6 depicts an example of the inverter 36, which includes two modules forming a given phase leg.

In the example of FIG. 6, the module 60 includes high side switches for each phase leg (i.e., the switches 52*a*, 54*a* and 56*a*). The module 62 includes low side switches for each phase leg (i.e., the switches 52*b*, 54*b* and 56*b*). Each switch in the module 60 is a Silicon power switch (e.g., an Si MOSFET or IGBT), and each switch in the module 62 is a WBG switch (e.g., a SiC switch or a GaN switch).

Embodiments may be used with various types of inverters. Such examples include single level and multi-level inverters, and current source inverters (CSIs).

It is noted that, although embodiments are discussed in conjunction with inverters, the embodiments are not so limited. Embodiments including different switch compositions, as well as modular constructions having modules for different switch composition, can be used in conjunction with other types of semiconductor switching devices and systems. Embodiments can be applicable to DC-DC converters, AC-AC converters, multi-level converters and others. For example, a power factor correction (PFC) stage of an on-board charging module (OBCM) can have a mix of Si and WBG (SiC) based switches, and/or a DC-DC stage of an OBCM can have mix of Si and WGB (SiC) based switches.

Various considerations used when designing the inverter (i.e., determining which switches have which compositions, positioning switches based on characteristics of different compositions, etc.) are described herein, along with methods for designing and/or manufacturing inverter assemblies.

Characteristics such as switching speed and sensitivity may be considered when selecting a type of switch at a given location or module in the inverter 36. For example, GaN switches have higher switching speeds and higher sensitivity to voltage spikes and changes in voltage (e.g., ΔVoltage/Δtime, or dv/dt) than Si switches, and are more affected by parasitic inductances in a switching loop. Accordingly, GaN and other switches having higher switching speeds may be selected for switches that have shorter current paths and switching loops.

For example, in the embodiment of the inverter 36 shown in FIG. 2, the switches 56*a* and 56*b* in the phase C leg are higher speed switches such as GaN or SiC switches. These switches are closer to the motor 20, and have shorter switching loops than the A and B legs.

In an embodiment, selection of switch composition for each switch is based on thermal properties of the inverter 36. In an embodiment, switch compositions that have higher temperature resistance or maximum temperature are positioned in regions that have higher temperatures when the inverter 36 is in use.

For example, the inverter 36 includes thermal control features such as heat sinks and/or coolant circulation. The thermal control features affect temperature gradients and the temperature distribution along the inverter 36, such that different switches experience different temperature levels.

Figure 7A:
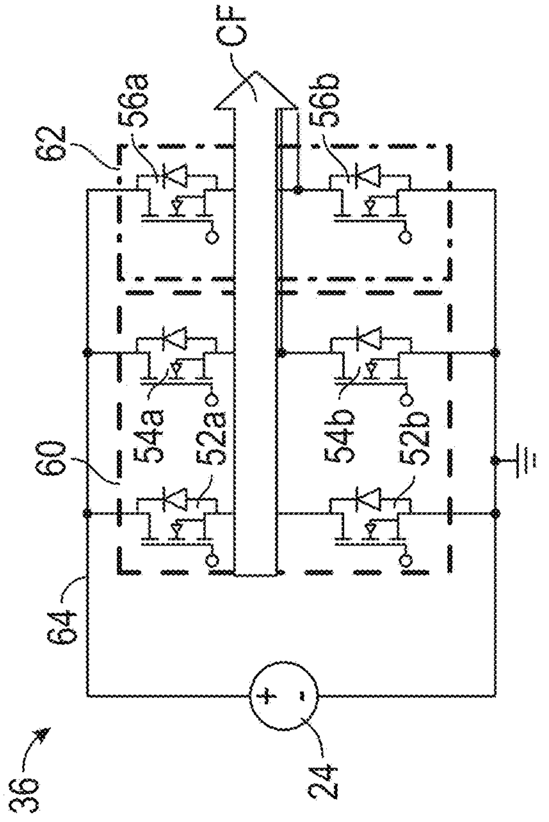
FIGS. 7A and 7B depict examples of an inverter assembly having modules configured based on thermal properties of the inverter assembly, in accordance with an exemplary embodiment.
Figure 7B:
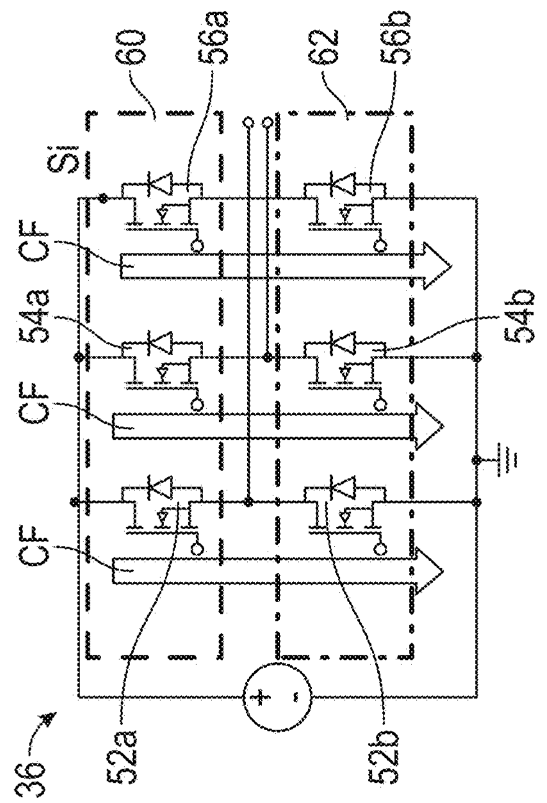

FIGS. 7A and 7B illustrate how temperature properties and temperature distributions affect switch placement, switch composition selection and switching module configurations. FIGS. 7A and 7B show examples of switching module configurations, in which switches are configured based on coolant entry/exit points. depending on the direction and path of coolant flow in a converter package.

In the example of FIG. 7A, coolant enters at one side of the inverter 36 and exits at another side. The general direction of coolant flow is denoted by an arrow CF. The module 60 includes Si switches, which have a lower maximum temperature than SiC switches. The module 62 includes SiC switches. In this way, higher temperature-rated switches are located in regions of higher coolant temperature.

In the example, of FIG. 7B, coolant enters at a high side location and flows generally vertically, as denoted by arrows CF. The module 60 (a high side module) includes Si switches, and the module 62 (a low side module) includes SiC switches. The modules 60 and 62 are positioned so that the lower temperature-rated switches are in regions in which the coolant temperature is lower, and the higher rated switches are in regions in which the coolant temperature is higher. In this way, modules can be designed so that the type of switch at a given location is optimized based on temperature variations.

Figure 8A:
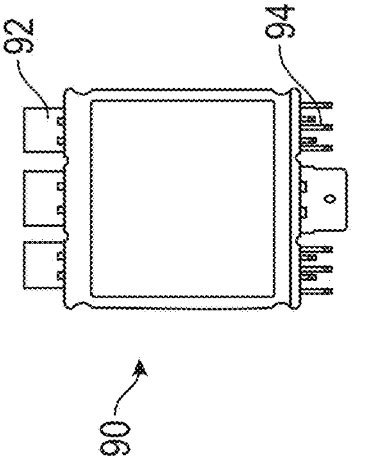
FIG. 8A depicts an example of a hybrid switch.

As noted above, embodiments provide for simplified hybrid switch designs by incorporating individual modules for different types of switches. FIG. 8A shows an example of an existing hybrid switch device 90 having two switches with different compositions that are connected in parallel to form a single functional switch. The hybrid switch device 90 includes a set of gate terminals 92 and signal pins 94.

Figure 8B:
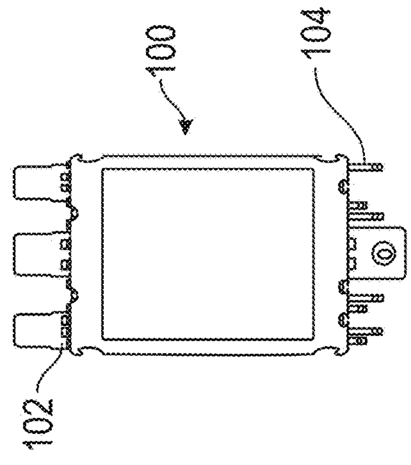
FIG. 8B depicts an example of a hybrid module in accordance with an exemplary embodiment.

FIG. 8B shows an embodiment of a hybrid switch device 100, which may form part of the inverter 36. The hybrid switch device 100 includes a different module for each type of switch. The hybrid switch device 100 includes a set of gate terminals 102 and signal pins 104.

The hybrid switch 90 requires a set of signal pins for each type of switch. In contrast, the hybrid switch device 100 does not need a dedicated set of pins for each device type, which significantly reduces the number of pins. In addition, the size of a power module can be reduced (e.g., 68 mm by 74 mm vs. 48 mm by 68 mm).

Embodiments include various methods for manufacturing and operating a conversion device. Such methods include designing and constructing individual modules for switches having different compositions, and connecting the modules and installing the modules in a power module, housing or other structure. Design of the modules is performed in part as described above, where individual inverter switches are selected based on factors such as desired performance, circuit properties (e.g., inductance of power loops), thermal properties and others.

Methods also include operating an inverter, for example, to drive an electric motor. Such methods include defining a suitable modulation scheme, such as pulse width modulation (PWM). The methods include selecting appropriate modulation parameters, such as dead time and pulse width.

For example, a minimum dead time and a minimum pulse width is selected and used for controlling all switches in the inverter, to avoid control complexity. Alternatively, for WBG switches, the dead time can be selectively assigned to each WBG switch to reduce reverse conduction losses. WBG switch voltages (gate-to-source) can be selected to control the reverse bias voltages of WBG devices to match the reverse bias voltages of Si switches.

Figure 9:
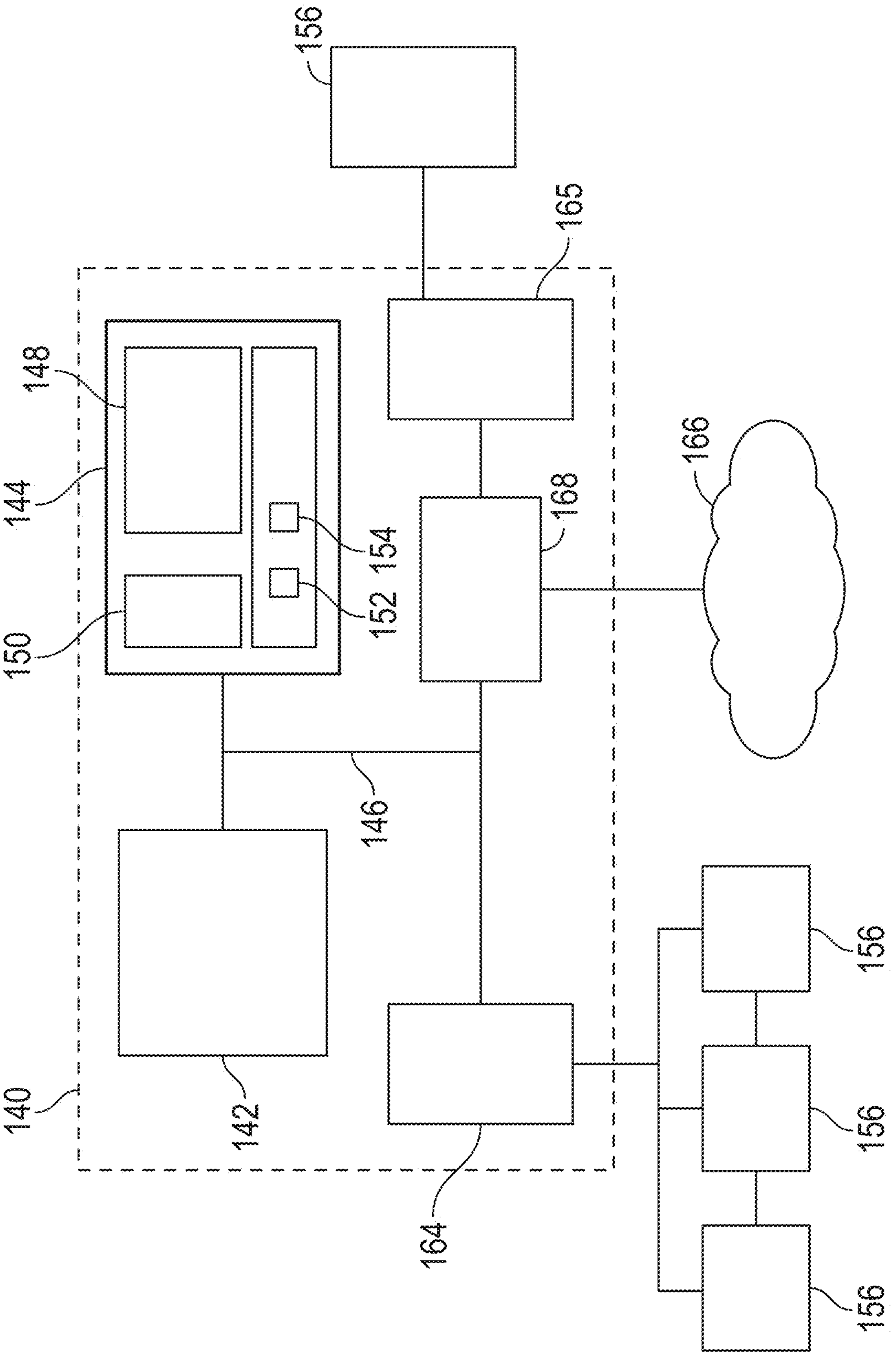
FIG. 9 depicts a computer system in accordance with an exemplary embodiment.

FIG. 9 illustrates aspects of an embodiment of a computer system 140 that can perform various aspects of embodiments described herein. The computer system 140 includes at least one processing device 142, which generally includes one or more processors for performing aspects of image acquisition and analysis methods described herein.

Components of the computer system 140 include the processing device 142 (such as one or more processors or processing units), a memory 144, and a bus 146 that couples various system components including the system memory 144 to the processing device 142. The system memory 144 can be a non-transitory computer-readable medium, and may include a variety of computer system readable media. Such media can be any available media that is accessible by the processing device 142, and includes both volatile and non-volatile media, and removable and non-removable media.

For example, the system memory 144 includes a non-volatile memory 148 such as a hard drive, and may also include a volatile memory 150, such as random access memory (RAM) and/or cache memory. The computer system 140 can further include other removable/non-removable, volatile/non-volatile computer system storage media.

The system memory 144 can include at least one program product having a set (e.g., at least one) of program modules that are configured to carry out functions of the embodiments described herein. For example, the system memory 144 stores various program modules that generally carry out the functions and/or methodologies of embodiments described herein. A module 152 may be included for performing functions related to monitoring a propulsion system, and a module 154 may be included to perform functions related to controlling an inverter assembly as described herein. The system 140 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 142 can also communicate with one or more external devices 156 as a keyboard, a pointing device, and/or any devices (e.g., network card, modem, etc.) that enable the processing device 142 to communicate with one or more other computing devices. Communication with various devices can occur via Input/Output (I/O) interfaces 164 and 165.

The processing device 142 may also communicate with one or more networks 166 such as a local area network (LAN), a general wide area network (WAN), a bus network and/or a public network (e.g., the Internet) via a network adapter 168. It should be understood that although not shown, other hardware and/or software components may be used in conjunction with the computer system 40. Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A device for driving an electric motor, comprising:

a converter assembly including a plurality of switches, the plurality of switches including a first phase leg and a second phase leg, the first phase leg including a first pair of switches connected in parallel to a first phase of the electric motor, the second phase leg including a second pair of switches connected in parallel to a second phase of the electric motor;

a first topological switch having one or more first switches of the plurality of switches, the one or more first switches having a first composition; and a second topological switch having one or more second switches of the plurality of switches, the one or more second switches having a second composition, the first composition being different than the second composition, wherein the one or more first switches have a first switching speed and the one or more second switches have a second switching speed, the first switching speed is higher than the second switching speed, and the one or more first switches are selected based on a length of a switching loop.

2. The device of claim 1, wherein the converter assembly is configured as an inverter.

3. The device of claim 1, wherein at least one of the first topological switch the second topological switch is part of a module, the module is removable and replaceable within the converter assembly, and the module includes connection components configured to connect at least one of the first topological switch the second topological switch to another topological switch of another module of the device.

4. The device of claim 1, wherein the plurality of switches are semiconductor switches, the first composition includes a first substrate and the second composition includes a second substrate, the first substrate having a different composition than the second substrate, each of the first substrate and the second substrate being a silicon-based substrate or a non-silicon-based substrate.

5. The device of claim 4, wherein each of the one or more first switches is a Silicon switch, and each of the one or more second switches is selected from at least one of: a Silicon-Carbide switch and a Gallium-Nitride switch.

6. The device of claim 1, wherein the one or more first switches are closer to the electric motor than the one or more second switches.

7. The device of claim 1, wherein the one or more first switches have a first maximum temperature and the one or more second switches have a second maximum temperature, the first maximum temperature is greater than the second maximum temperature, and the one or more first switches are positioned based on a thermal distribution of the device during operation.

8. The device of claim 1, wherein the first topological switch is part of a first module and the second topological switch is part of a second module, the first module and the second module are removeable and replaceable, and the first module and the second module are disposed in a single power module connectable to a battery and the electric motor.

9. A method of driving an electric motor, comprising:

controlling a converter assembly to supply electric power to the electric motor, the converter assembly including:

a plurality of switches, the plurality of switches including a first phase leg and a second phase leg, the first phase leg including a first pair of switches connected in parallel to a first phase of the electric motor, the second phase leg including a second pair of switches connected in parallel to a second phase of the electric motor;

a first topological switch having one or more first switches of the plurality of switches, the one or more first switches having a first composition; and a second topological switch having one or more second switches of the plurality of switches, the one or more second switches having a second composition, the first composition being different than the second composition, wherein the one or more first switches have a first switching speed and the one or more second switches have a second switching speed, the first switching speed is higher than the second switching speed, and the one or more first switches are selected based on a length of a switching loop.

10. The method of claim 9, wherein the converter assembly is configured as an inverter.

11. The method of claim 9, wherein at least one of the first topological switch the second topological switch is part of a module, the module is removable and replaceable within the converter assembly, and the module includes connection components configured to connect at least one of the first topological switch the second topological switch to another topological switch of another module of the converter assembly.

12. The method of claim 9, wherein the plurality of switches are semiconductor switches, the first composition includes a first substrate and the second composition includes a second substrate, the first substrate has a different composition than the second substrate, and each of the first substrate and the second substrate is a silicon-based substrate or a non-silicon-based substrate.

13. The method of claim 9, wherein the converter assembly is controlled based on a pulse width modulation scheme, and the pulse width modulation scheme prescribes a single dead time and a single pulse width for the plurality of switches.

14. The method of claim 9, wherein the one or more first switches are closer to the electric motor than the one or more second switches.

15. The method of claim 9, wherein the one or more first switches have a first maximum temperature and the one or more second switches have a second maximum temperature, the first maximum temperature is greater than the second maximum temperature, and the one or more first switches are positioned based on a thermal distribution of the converter assembly during operation.

16. The method of claim 9, wherein the first topological switch is part of a first module and the second topological switch is part of a second module, the first module and the second module are removeable and replaceable, and the first module and the second module are disposed in a single power module connectable to a battery and the electric motor.

17. A vehicle system comprising:

a memory having computer readable instructions; and a processing device for executing the computer readable instructions, the computer readable instructions controlling the processing device to perform a method including:

controlling a converter assembly to supply electric power to an electric motor, the converter assembly including:

a plurality of switches, the plurality of switches including a first phase leg and a second phase leg, the first phase leg including a first pair of switches connected in parallel to a first phase of the electric motor, the second phase leg including a second pair of switches connected in parallel to a second phase of the electric motor;

a first topological switch having one or more first switches of the plurality of switches, the one or more first switches having a first composition; and a second topological switch having one or more second switches of the plurality of switches, the one or more second switches having a second composition, the first composition being different than the second composition, wherein the one or more first switches have a first switching speed and the one or more second switches have a second switching speed, the first switching speed is higher than the second switching speed, and the one or more first switches are selected based on a length of a switching loop.

18. The vehicle system of claim 17, wherein at least one of the first topological switch the second topological switch is part of a module, the module is removable and replaceable within the converter assembly, and the module includes connection components configured to connect at least one of the first topological switch the second topological switch to another topological switch of another module of the device.

19. The vehicle system of claim 17, wherein the plurality of switches are semiconductor switches, the first composition includes a first substrate and the second composition includes a second substrate, the first substrate having a different composition than the second substrate, each of the first substrate and the second substrate being a silicon-based substrate or a non-silicon-based substrate.

20. The vehicle system of claim 17, wherein the module is disposed in a single power module connectable to a battery and the electric motor.

* * * * *